(No Model.)

W. P. & J. W. BETTENDORF.
METALLIC WHEEL.

No. 440,533.   Patented Nov. 11, 1890.

Witnesses:

Inventor:
W. P. Bettendorf
J. W. Bettendorf
By Phil. T. Dodge Atty

UNITED STATES PATENT OFFICE.

WILLIAM P. BETTENDORF AND JOSEPH W. BETTENDORF, OF DAVENPORT, IOWA.

METALLIC WHEEL.

SPECIFICATION forming part of Letters Patent No. 440,533, dated November 11, 1890.

Application filed May 10, 1890. Serial No. 351,308. (No model.)

*To all whom it may concern:*

Be it known that we, WILLIAM P. BETTENDORF and JOSEPH W. BETTENDORF, of Davenport, in the county of Scott and State of Iowa, have invented certain Improvements in Metallic Wheels, of which the following is a specification.

Our invention relates to a wheel having metal spokes, the inner ends of which are fitted over and permanently secured to tenons or projections on a metal hub. We prefer in most cases to cast the hub complete, of malleable iron or similar material, with radially-projecting tenons thereon, and to employ tubular iron or steel spokes, the inner ends of which are fitted over the tenons and welded thereto, so that the two parts are rigidly and inseparably united.

Figure 1:
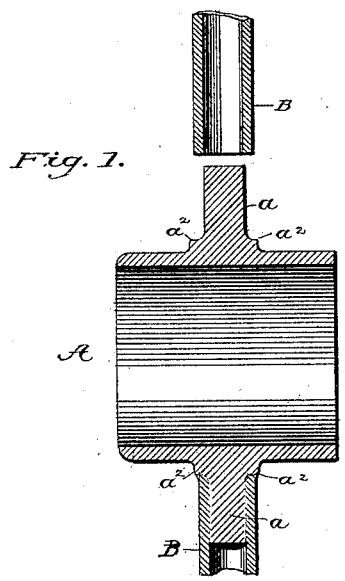
Figure 2:
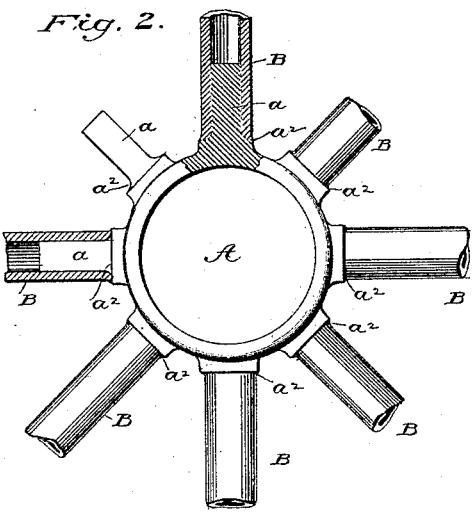
Figure 3:
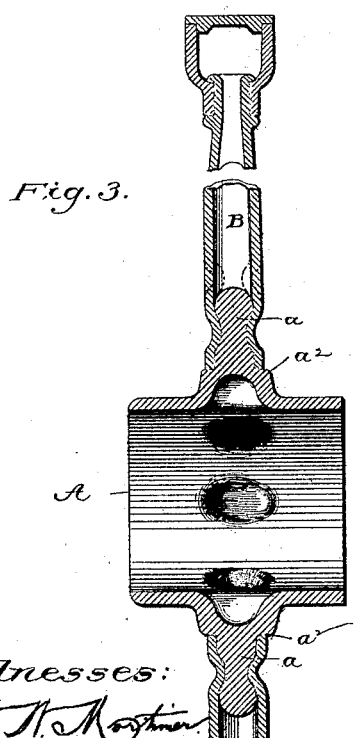
Figure 4:
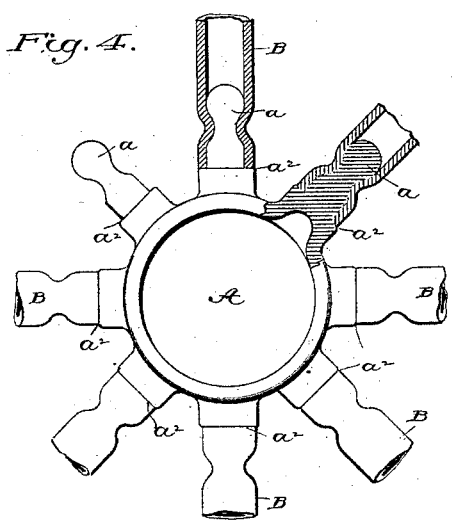

In the accompanying drawings, Figure 1 represents in cross-section a hub with spokes attached thereto in accordance with our invention and a second spoke in position for insertion. Fig. 2 is a side view of the same, partly in section. Fig. 3 is a cross-section of another form. Fig. 4 is a side elevation of the same, partly in section.

Referring to the drawings, A represents an annular metal hub formed in one piece with a series of radially-projecting studs or tenons $a$, each of which is fitted into the inner tubular end of a metal spoke B. The tenons and spokes may be of cylindrical, elliptical, or other suitable form in cross-section, and the spokes fastened in place in any suitable manner; but we prefer to weld the spoke to the tenon, and this is our usual practice. This welding may be accomplished by heating the parts to a suitable temperature and subjecting them to pressure or to blows under the proper conditions, such as are known to those skilled in the art. In order to reduce the longitudinal strains on the joints, the inner end of the spoke is seated solidly against the hub or shoulder $a^2$ thereon, as shown.

In Fig. 2 we have represented the hub A with the tenons $a$ recessed or indented in their edges, as shown at $a^2$, and with the tubular spokes fitted tightly over the tenons and compressed into their indentations in order to hold them the more firmly in place. The spoke is preferably welded to the tenon, as in the first example. It will be understood that the form of the tenons and spokes may be varied at will, provided only the spokes embrace or inclose the tenons.

The distinguishing feature of our wheel is the fact that the projections on the hub are fitted and secured within the spokes, thus avoiding the difficulties and objections which attend the introduction of the spokes into mortised hubs or hub-sockets.

Having thus described our invention, what we claim is—

1. A metal wheel-hub having tenons or projections integral therewith, in combination with tubular spokes fitted over and sustained at their inner ends solely by said tenons.

2. A metal wheel-hub having integral therewith radial tenons or projections with indentations therein, in combination with tubular spokes fitted over said tenons and into the indentations.

3. A metal wheel-hub having integral therewith projections or tenons thereon, in combination with tubular metal spokes fitted over and welded to said tenons.

In testimony whereof I hereunto set my hand, this 5th day of May, 1890, in the presence of two attesting witnesses.

WILLIAM P. BETTENDORF.

Witnesses:
PHILIP T. DODGE,
W. R. KENNEDY.

In testimony whereof I hereunto set my hand, this 7th day of May, 1890, in the presence of two attesting witnesses.

JOSEPH W. BETTENDORF.

Witnesses:
S. S. STACKHOUSE, Jr.,
AUG. A. BALLUFF.